US011562589B2

(12) United States Patent
Reynolds

(10) Patent No.: US 11,562,589 B2
(45) Date of Patent: Jan. 24, 2023

(54) METHODS AND APPARATUS FOR DETECTING PARTITIONS IN TABLES AND USING PARTITION INFORMATION

(71) Applicant: Accusoft Corporation, Tampa, FL (US)

(72) Inventor: John Reynolds, Riverview, FL (US)

(73) Assignee: Accusoft Corporation, Tampa, FL (US)

( * ) Notice: Subject to any disclaimer, the term of this patent is extended or adjusted under 35 U.S.C. 154(b) by 73 days.

(21) Appl. No.: 17/006,783

(22) Filed: Aug. 28, 2020

(65) Prior Publication Data

US 2022/0067360 A1    Mar. 3, 2022

(51) Int. Cl.
*G06V 30/412* (2022.01)
*G06K 9/62* (2022.01)
*G06N 3/08* (2006.01)
*G06V 10/44* (2022.01)
*G06V 10/56* (2022.01)
*G06V 10/774* (2022.01)
*G06N 3/04* (2006.01)

(52) U.S. Cl.
CPC ......... *G06V 30/412* (2022.01); *G06K 9/6256* (2013.01); *G06N 3/08* (2013.01); *G06V 10/44* (2022.01); *G06V 10/56* (2022.01); *G06V 10/774* (2022.01); *G06N 3/04* (2013.01)

(58) Field of Classification Search
CPC ...... G06V 30/412; G06V 10/44; G06V 10/56; G06V 10/774; G06K 9/6256; G06N 3/04; G06N 3/08
See application file for complete search history.

(56) References Cited

U.S. PATENT DOCUMENTS

| | | | | |
|---|---|---|---|---|
| 7,343,320 B1* | 3/2008 | Treyz | ................. | G06Q 30/0641 358/487 |
| 2004/0049459 A1* | 3/2004 | Philliou | ................. | G06Q 20/04 705/40 |
| 2020/0151444 A1* | 5/2020 | Price | ........................ | G06N 3/08 |

OTHER PUBLICATIONS

Shafait, et al. "Table Detection in Heterogeneous Documents", pp. 65-72. (Year: 2010).*

* cited by examiner

*Primary Examiner* — Daniel G Mariam
(74) *Attorney, Agent, or Firm* — Straub & Straub; Michael P. Straub; Stephen T. Straub

(57) ABSTRACT

Methods and apparatus for training neural networks to identify information table partitions are described. Also described are methods and apparatus of using a trained neural network to process an image and provide partition information in an easy to use format. The format of the partition information is one which is simple to interpret, easy to communicate and uses values which facilitate successful training and recognition of partitions in tables whether the partitions be implicitly defined by data arrangement or explicitly define using lines. An image is treated as including a predetermined number of row and column portions. The neural network generates for each predetermined portion a partition present indicator value and a partition location value. The partition present value in some embodiments is a value in the range of 0 to 1 and the partition location value in some embodiments is a value in the range of −1 to +1.

23 Claims, 8 Drawing Sheets

| Description | Qty | Price | Amount |
|---|---|---|---|
| Cleaning Service May 2014 | 4 | 275.00 | 1,100.00 |
| Special event cleanup | 1 | 1,250.00 | 1,250.00 |
| | | Total | 2,350.00 |

Thank you for you business

400

FIGURE 4

METHODS AND APPARATUS FOR DETECTING PARTITIONS IN TABLES AND USING PARTITION INFORMATION

FIELD

The present application relates to image processing and, more particularly, to methods and apparatus for detecting the location of partitions in tables and/or extracting information from cells defined by identified partitions.

BACKGROUND

Many forms include information in a table structure. The table structure may be explicitly defined using lines or implicitly defined based on the spacing of locations where information is placed in the table structure. A location in a table where information is placed is often called a cell or an information cell.

It is often desirable to be able to extract information from an image of a form and use the information for a variety of purposes.

While optical character recognition may be and often is used to identify words and/or numeric values the meaning of such information often depends on which cell of a form the information was obtained from. To be able to understand and use extracted information it is often desirable to know which cell of a form the information was extracted from.

From the above it should be appreciated that it is desirable to be able to identify partitions of tables in images to facilitate information extraction and use.

Unfortunately in many cases while it may be know that an image includes a table from which information is to be extracted, the format of the table and location of table partitions in an image to be processed is often unknown at the time image is presented for processing, e.g., after capture or scanning of a form or other document. Such tables may be, and sometimes are, referred to as semi-structured since while they have some table structure the exact structure may not be known at the time the image including the table is to be processed. Thus, while it might be known an image includes a table, the table may have no predefined structure, aside from the fact that it is grid-based.

The problem of identifying the structure and placement of partitions in a table in an image is often complicated by the fact that while some tables have lines that partition the space into cells, many are implied by the distribution of where content in the table is placed, alignment, etc. without explicit dividing lines.

In view of the above it should be appreciated that for many applications relating to tables, there is a need for a method to automatically determine where the row and/or column partitions are located in a table included in an image being processed. It would be desirable if methods and/or apparatus could be developed which would be capable of identifying table partitions without prior knowledge of the particular table being processed. Furthermore, it would be desirable if the method could work with tables of various sizes.

SUMMARY

Methods and apparatus for identifying the location of partitions used to define a table are described. The methods and apparatus are well suited for use where the precise structure of the table being processed is not known beforehand.

In various embodiments a neural network is used in determining partition-related information for an image including a table.

In various embodiments, before using the neural network to determine partition information, the neural network is trained using a set of images including known tables. Successful detection of partition information relates in part on how partition information is represented during the training process. In various embodiments as part of the training process images are normalized to be square in shape and of a predetermined size. By processing training images so that they are of uniform shape and size, the difficulty of having to train the neural network to handle images of different sizes and shapes can be avoided. Furthermore, by representing the partition information in the training data in a way that lends itself to successful training and implementation of a neural network capable of identifying the patterns being trained, the methods and apparatus are capable of producing a system which can be used to detect table partition information in a wide range of images.

In various embodiments images are treated as including a predetermined plurality of row and/or column portions. The number of row portions and column portions may be and in some embodiments is the same. The partition data used during training and the output data obtained during use of the trained neural network is expressed in the form of two values for each row and/or column portion of an image. The first value indicates whether the portion includes a partition while the second value indicates a position offset. When a partition is determined to be present in a row or column portion of an image, the position offset in some, but not necessarily all embodiments, indicates, relative to the center of the image portion to which the second value corresponds, where the partition is located in the image portion.

The representation of partition information as two values per row and column portion allows the partition information to be easily represented as an array of pairs of values, e.g., one pair corresponding to each row portion or column portion.

The representation of partition information and image data in the described manner facilitates successful use of a neural network, implemented using one or more layers, to successfully recognize partition information. This is in part because the dimensionality of the data used to represent the image can be easily reduced separately in the vertical and horizontal dimensions in a way that facilitates processing by neural network layers or subnetworks used to process the image data corresponding to the row and column portions.

The methods and apparatus also achieve a quality recognition result through the use of values, in at least some embodiments, to represent the partition information that are particularly well suited for use with neural networks intended to process images. The inventor recognizes that some neural networks often tend to work well when the values they determine are in the range of −1 to 1. In at least some embodiments the first value indicating the presence or absence of a partition in a portion of an image is indicated by a 0 or a 1, e.g., with 0 indicating no partition present and 1 indicating a partition present in some embodiments. In some embodiments the second value used to provide partition information for a portion of an image is expressed a value in the range of −1 to 1. While a relatively small number of row and column partitions, e.g., under a 100 row and under 100 column portions per image, may be considered for an image being analyzed, when the position information is taken into consideration the location of row and/or partitions within an image such as a page of text can be determined with a high degree or reliability.

After training of the neural network images including a tables with unknown partition locations are processed and the neural network is used to determine partition information, e.g., the presence or absence of a partition in one or more row and column portions and, when a partition is present the position of the partition in the row or column portion in which a partition was detected. To facilitate use of the neural network, prior to image data being supplied to the neural network for processing, the image is represented in grayscale format and is transformed to the square size for which the neural network was trained. Upon completion of the partition detection operation by the neural network, the partition location and position information is translated into meaningful dimensions which are relevant to the original image size taking into consideration the transform that was required to translate the input image to the square image size of images processed by the neural network.

With the location of table partitions in the original image known based on the use of the trained neural network, information is then extracted from the cells of the table and used to support one or more applications, e.g., invoicing or billing applications, data entry applications, etc.

By training a neural network to recognize partitions in images, and then using the trained neural network to process images the technical problem of identifying partition locations in images where the partition locations are not known can be addressed with a high degree of success. Furthermore, once trained it should be appreciated that the neural network can be used without further training. Thus, the training can be viewed as a process of generating a trained neural network that is well suited for detecting table partitions and indicating their location in a way that can be easily expressed and used.

While in some embodiments the trained neural network used in the partition detection is implemented in individual computer devices used to process forms, in some embodiments the neural network is implemented on a server which is accessible via the Internet with devices transmitting image data to the neural network and receiving partition information back from the neural network in response to the provided image. Such an embodiment may be viewed as a cloud based solution. The relatively simple format of representing partition information, e.g., pairs of values in the range of −1 to 1, for each of a number of row and column partitions, lends itself to easy communication and interpretation. Thus not only does the partition information format facilitate successful neural network training and partition detection, it also lends itself well to cloud based implementations where it can be desirable that data be represented in an easy to communicate and understandable format without the need for a lot of overhead to communicate the data.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE FIGURES

FIG. 4 illustrates the form of FIG. 3 after resizing to a square size in accordance with one feature of the invention.

DETAILED DESCRIPTION OF THE INVENTION

Figure 1:
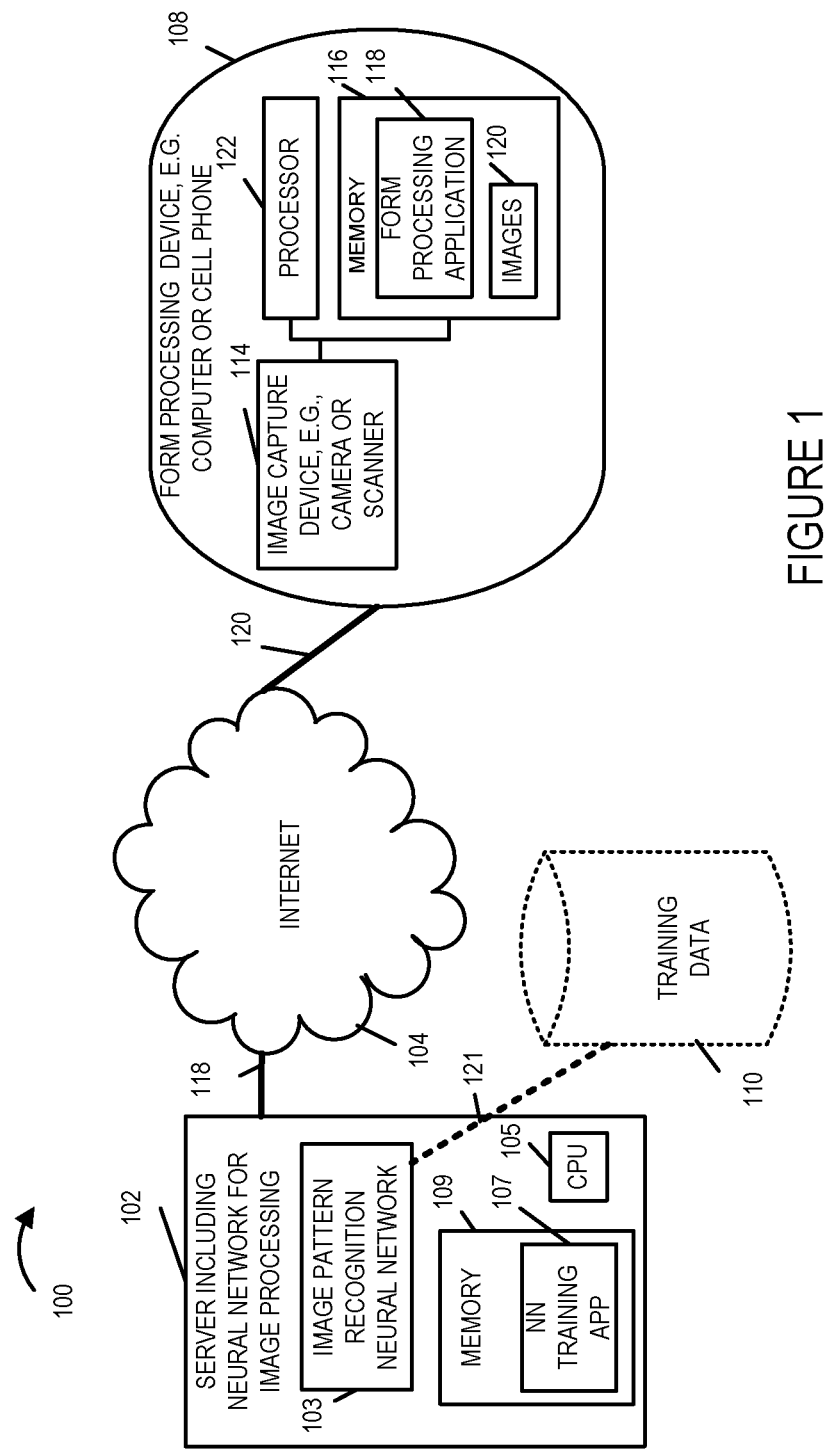
FIG. 1 is a drawing of an exemplary system in accordance with an exemplary embodiment.

FIG. 1 is a drawing of an exemplary system 100 implemented in accordance with an exemplary embodiment. The system 100 includes a server 102 that is coupled to one or more form processing devices 108 via a communications network which in the FIG. 1 example includes the Internet 104 and communications links 118, 120. The server 102 includes a neural network 103 which is capable of performing pattern recognition on image data. Any of a variety of different neural networks can be used as the neural network 103 with the particular number of layers or connections inside the neural network not being critical to the invention. In some embodiments neural network 103 is implemented as a residual neural network (ResNet). Such networks have been found to be well suited for recognizing patterns of a variety of different types in images. As will be discussed below, the training of the network 103 is trained data which indicates partition presence or absence in portions of the training image, e.g., predetermined row and column portions. The training data also includes for each row or column portion where a partition is indicated to be present a value, e.g., a position offset value, indicating the location of the partition within the row or column portion in which the partition is located.

The form processing device 108 may be and in some cases is a cell phone or computer. The form processing device 108 includes in some embodiments an image capture device 114 which is coupled to a processor 122 and memory 116. The memory 116 includes a form processing application 118 that can send a captured image to the neural network 103 for table partition detection purposes as well as captured images 120. As will be discussed further below, partition information received back from the neural network 103 can and sometimes is used by the form processing application to identify content corresponding to different information cells of a table included in the image being processed.

The image capture device 114 maybe, and in some embodiments is, a camera or scanner which is used to capture images of a document such as an invoice, order or other form that includes a table. While shown internal to the form processing device the image capture 114 may be and in some embodiments is an external device which provides images including tables to the form processing device via a wired or wireless interface or a communications network such as the Internet 104.

While the neural network 103 is shown coupled to the form processing device in some embodiments it is included in the form processing device 108.

In addition to the form processing device 108 and server 102, the system shown in FIG. 1 is also shown as including a set of training data 110. The training data can be supplied, via link 121 to the server 102. The training data and the training can be and sometimes is controlled by the form processing device or another device and/or a processor included in the server 102. The training data 110 included images and corresponding known partition information. Thus, for each training image, known partition information is also provided. The training data is used to train the neural network to recognize portions when processing one or more images including a table. The training data 110 and link 121 are shown with dashed lines since once the neural network 102 is trained using the training data, it need not be used again and the system can process and detect table partitions without further use of the training data. Accordingly, the training data need not be present or available when the system 100 is used for recognition of table partitions in images supplied by the form processing device 108.

Figure 2:
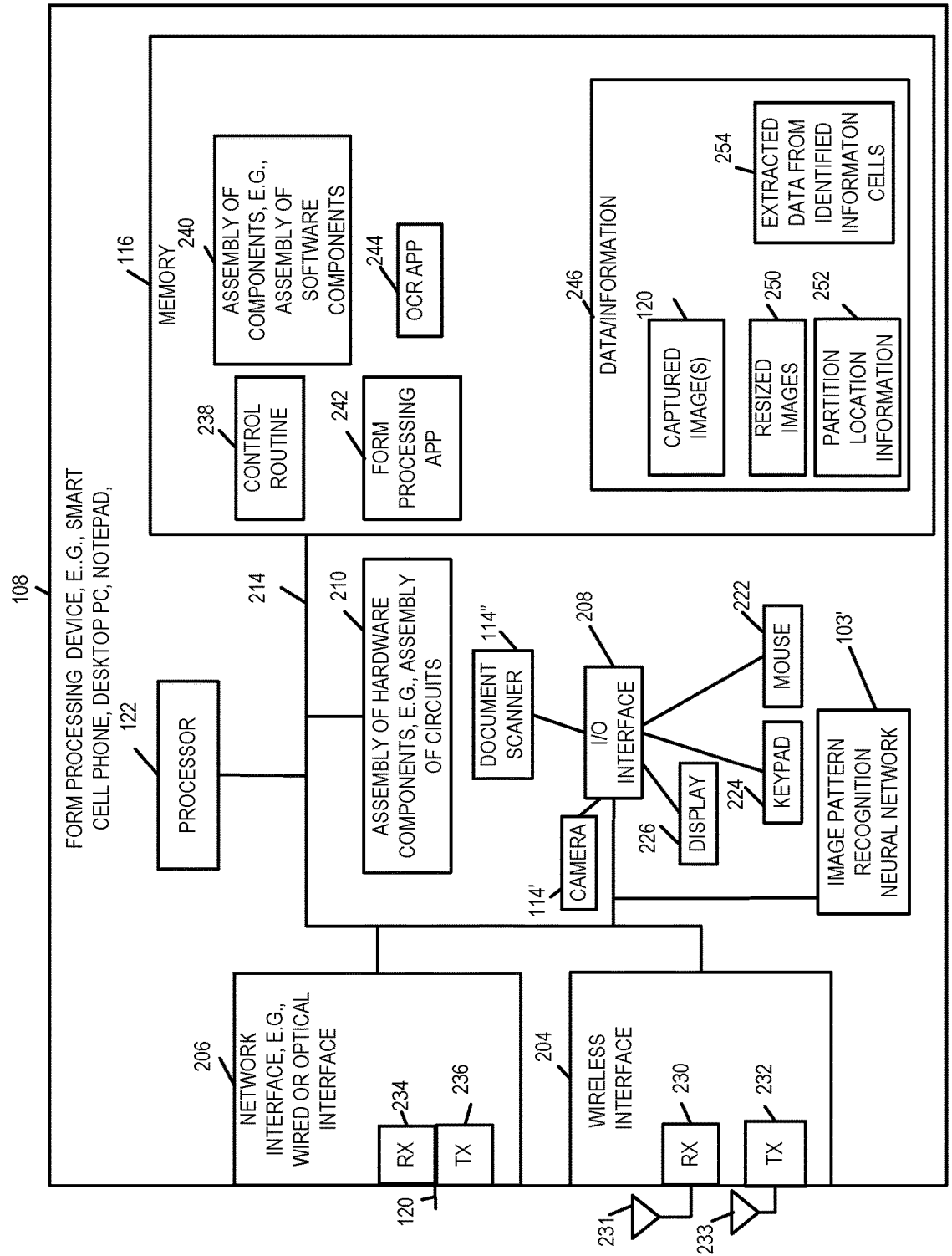
FIG. 2 illustrates an exemplary form processing device implemented in accordance with the invention and which can be used in the system shown in FIG. 1.

FIG. 2 shows an exemplary form processing device 108 that can be used in the system shown in FIG. 1. FIG. 2 shows the form processing device 108 in greater detail than was shown in FIG. 1. Components which have already been explained with regard to FIG. 1 are identified using the same reference numbers in FIG. 2 as were used in FIG. 1. In the FIG. 2 embodiment it can be seen that the form processing device 108 includes wired or optical network interface 206 in addition to wireless interface 204. The network interface 206 is connected to the Internet via connection 120 and includes a receiver RX 234 for receiving data and information. The interface 206 also includes a transmitter TX 236 used for sending images and data to other devices including the server 102 and neural network 103 included therein. The wireless interface 204 includes a radio receiver 230 coupled to receive antenna 231 and a radio transmitter 232 coupled to transmit antenna 233. The wireless interface 204 can be used to wirelessly communicate with other devices in the system.

Interfaces 206, 204 are coupled to processor 122, memory 116, an assembly of hardware components 210 and I/O interface 208 by bus 214 which can be used to communicate data and/or other information between the devices coupled to the bus 214. The I/O interface 208 coupled various devices including camera 114', document scanner 114", display 226, keypad 224 and mouse 222 to the bus 214. A user can capture document images using the scanner 114 and/or camera 114 which can then be stored in memory as part of the set of captured images 120. Optionally the form processing device can include the neural network 103' used for partition recognition. In such cases the neural network 103' can be the same as the neural network 103 used in the servers shown in FIG. 1. Including the trained neural network 103' in the form processing device allows partitions to be detected using the neural network 103' without the form processing device to contact an external device for image processing by a neural network since the form processing device includes that capability.

Memory 116 includes a control routine 208, a form processing application 242, an optical character recognition application 244, an assembly of components 240 and data/information 246. The data/information 246 includes captured images 120, resized images 250, partition location information 252, and extracted data from identified cells of forms 254. The control routine includes instructions which when executed by the processor 122 cause the device 108 to operate in accordance with the invention, e.g., to implement the steps shown in flow charts of FIG. 9 and/or FIG. 10.

The form processing application 242 will control image capture by the scanner 114" or camera 114' and/or control the processing of images representing forms which are supplied to the device 108 via one of the interfaces 204, 206. The form processing application 242 in some embodiments, when executed by the processor 122, causes the processor 122 to control the device 108 to implement the method shown in FIG. 10. OCR application 244 is used to process cell information and identify charters, numbers, and/or words included in information cells of tables and/or other portions of images of forms.

The data/information 246 includes captured images, e.g., one or more images of a form including a table. Resized images 250 include resized versions of one or more images which include a table. The resized images maybe and often are scaled versions of the captured images which, as will be discussed further below, are scaled to be square and of the overall size which is expected by the trained neural network 103 used to detect table partitions in images. The data/information 246 also includes partition location information 252 for each image including a table which is processed. As will be discussed further below the partition location information 252 for an image is returned by the neural network 203 and indicates the location of row and/or column partitions which are detected by the neural network in the image to which the returned information corresponds. The format of such information will be discussed further below. Extracted data 254 includes information cell content obtained from cells identified based on the partition location information 254. The extracted data 254 may and sometimes does include cell information in the form of words or numbers recovered by using the OCR application 244 on the image portion corresponding to a cell determined from the partition information. The extracted data is stored and/or used to perform one or more physical operations such as shipping products that were listed in a processed order form or completing a billing operation associated with a processed invoice, e.g., electronic payment or tracking of a bill.

Figure 3:
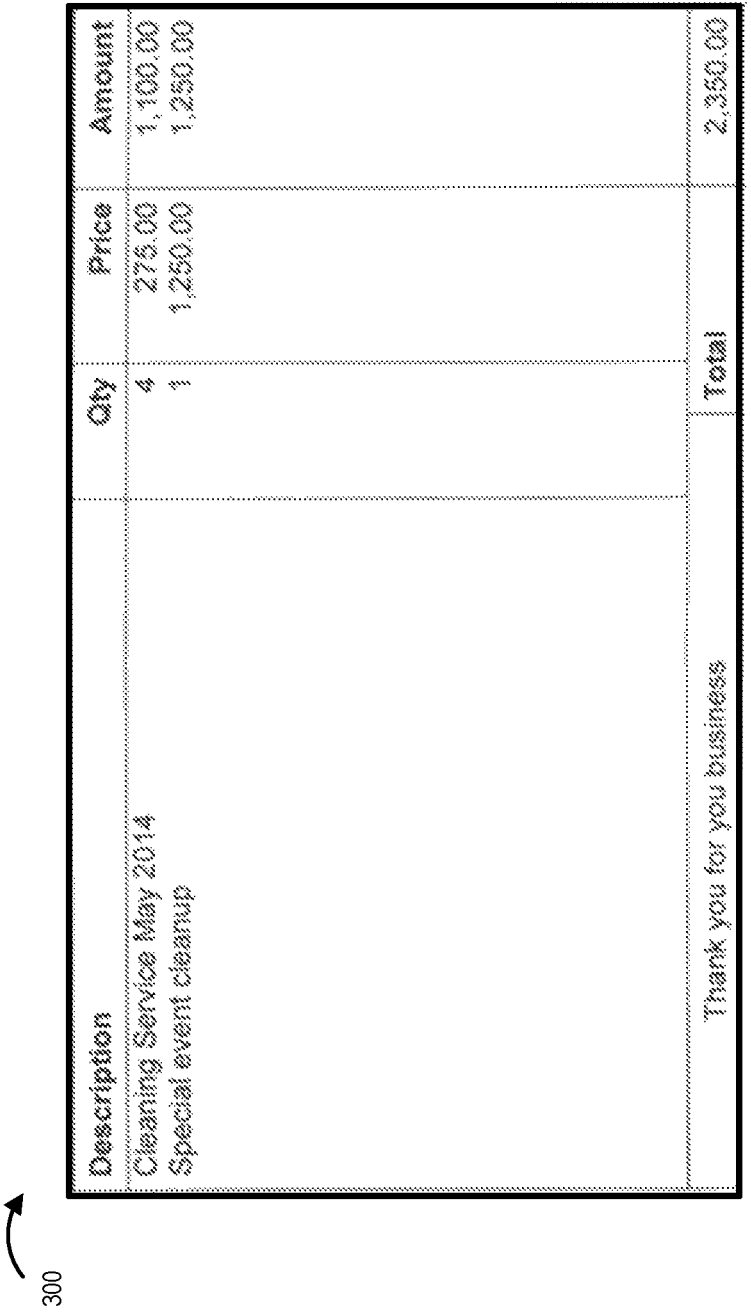
FIG. 3 illustrates an exemplary form including a table.

FIG. 3 illustrates an exemplary image 300 of an invoice form including a table. The table includes a plurality of partitions represented by lines. However, it should be appreciated that many forms include tables where explicit lines are not used to indicate portions.

The image 300 is an example semi-structured invoice table. The image represents a typical image that might be obtained from a user of the device 108. In the image 300, there are vertical and horizontal partitions representing the gridlines of the table. These go all the way down and across the image, respectively. However, there's also a vertical line next to total which, while accurately representing a cell of information, doesn't represent something with which we'd like to partition the table vertically. By training with an adequate number of labeled training images the neural network 103 can be trained to distinguish between lines which should be used to partition a table and lines which should be ignored.

In addition to the table partition lines which are explicitly shown in image 300, there is an implied partition between the two rows of data. This implied partition is something that the machine learning is trained to identify as part of the training processor so that the implied row partitions are correctly identified and their location signaled as part of partition information returned from the neural network 103 when an image such as the image 300 is processed.

Various embodiments rely on the use of a convolutional neural network (CNN, or ConvNet) or ResNET to preform partition detection operations. In essence, the table partitions are patterns in the image of a form which the neural network being used is trained to find. A CNN is a class of deep neural networks commonly applied to analyzing visual imagery. A residual neural network (ResNet) is another type of artificial network which is also well suited for pattern recognition applications and maybe and sometime are used for the neural network 103.

Neural networks work well when the image to be processed is of the same size as the images which were used to train the network. A symmetrical image, e.g., a square image can also facilitate training and/or implementation of the neural network at least in some cases.

In various embodiments both training images and images to be processed are resized to be square and of a predetermined size to facilitate neural network training and use.

FIG. 4 illustrates the form of FIG. 3 after resizing to a square shape and predetermined size in accordance with one feature of the invention.

In addition to using square images with the neural network 103 advantages can be obtained by using values which are limited to the range of −1 to +1.

Figure 5:
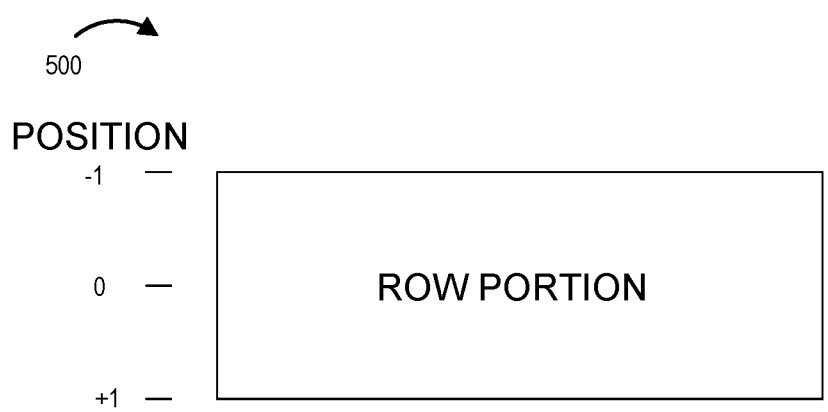
FIG. 5 illustrates an exemplary table portion and how the position of a partition can be indicated using values in a range from −1 to +1.

FIG. 5 illustrates an exemplary row table portion 500 and how the position of a partition can be indicated using values in a range from −1 to +1 indicating offset locations with respect to the center of the portion to which the value corresponds. Note that a position of 0 corresponds to a partition located at the center of the row portion. Thus a position value of 0 would indicate a partition that divides the row portion in half horizontally. A −1 value corresponds to a partition located at the very top of the row portion while a −1 indicates a partition at the very bottom of the row portion. Fractional or decimal values can be used to specify a partition location anywhere in the range of −1 to +1. While the concept of using a value in the range of −1 to +1 to indicate position of a partition in an image portion is explained in the context of row portions of an image, the same technique can and is used in some embodiments to indicate the location of partitions in column portions of an image.

In various embodiments the idea of using a value in the range of −1 to +1 to indicate the location of a partition in an individual image portion is extended to the concept that an image can include a number of image portions, e.g., a predetermined number of row and/or column portions. The image portions may be and sometimes are of a predetermined size, e.g., a uniform image size to facilitate neural network implementation and training.

With an image including a number of different portions, it can be useful to know whether a portion includes a partition or not. In some embodiments a single value, e.g., a 0 or 1, can be used to indicate if a portion includes a partition. During training the presence or absence of a partition is known so a 0 or 1 is used. However when performing detection on an image the neural network 103 can generate a value in the range of 0 to 1 indicating a probability of the presence of a partition with a 1 representing absolute certainty a partition is present and a 0 representing a certainty that a partition is not present. Such a value can be and sometimes is referred to as a partition presence indicator, e.g., with a 1 indicating in some embodiments that a partition is present in the corresponding image portion and a 0 indicating that a partition is not present. In systems which do not accept or work with probabilities the neural network output can, and sometimes does, round the partition present value to 0 or 1 for simplicity.

Figure 6:
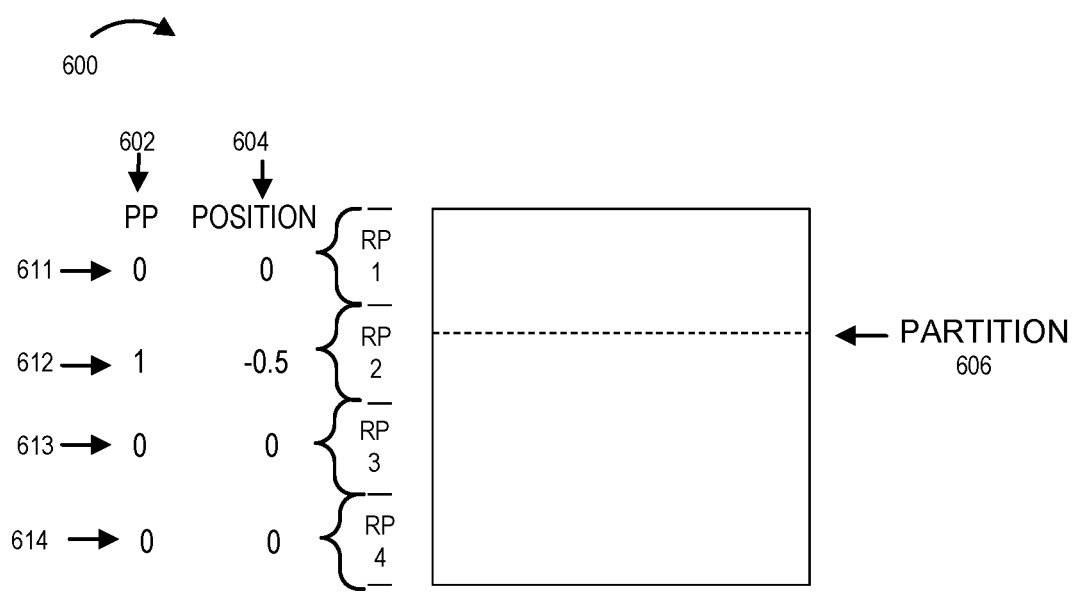
FIG. 6 illustrates an exemplary table including four row portions along with partition presence information and partition location information.

FIG. 6 illustrates an exemplary image 600 of table including four row portions (RP1, RP2, RP3 and RP4) along with corresponding partition presence information and partition location information. A single partition 606 is shown in the FIG. 6 example. Position presence values are shown in column 602 while partition location values are shown in column 604. For each row portion RP1, RP2, RP3, RP4 there is a corresponding pair of values, e.g., a partition present value and a partition position value. Consider for example row 611 shows that for RP1 the participation present value is 0 since the RP1 does not include a row partition and the position value is 0 since no partition is present. The information 613 for the third row portion RP3 and the information 614 for the fourth row portion RP4 also include pairs of Os since these portions also do not include a row partition. Note however that row portion RP2 includes a partition and thus the information 612 for this row portion includes a 1 for the partition present indicator value and a −0.5 for the partition location value given that the partition 606 is located halfway between the −1 and 0 positions.

Thus one can think of the example in FIG. 6 as four "rows" containing two values each: a 0 to 1 value determining whether or not a partition exists in the cell, and a −1 to 1 value representing the relative offset from the midpoint of the row.

Figure 7:
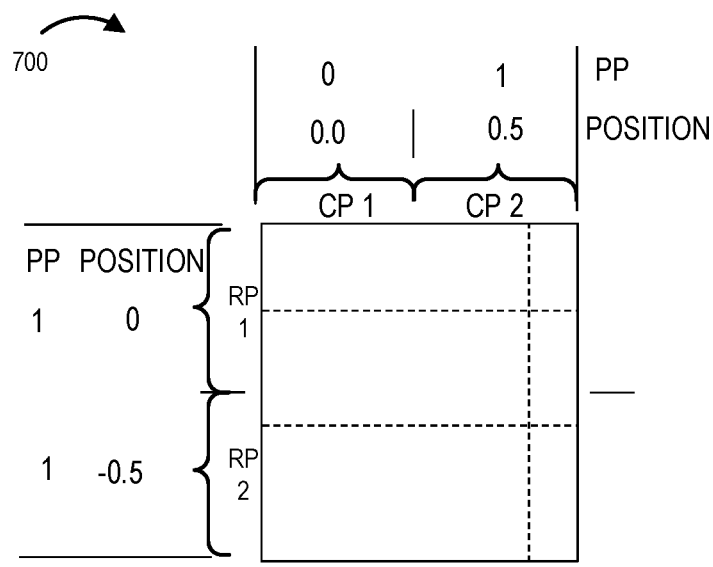
FIG. 7 illustrates an exemplary training image including two row partitions and one column partition along with corresponding training values.

FIG. 7 illustrates an exemplary training image 700 including two row portions RP1 and RP2 and two column portions CP1 and CP2. FIG. 7 shows an example of a 2×2 grid with three partitions included in the image. The training data passed in would be: "<image data> [(1 0.0), (1 −0.5)] [(0 0.0), (1 0.5)]" (where the data is represented in the format: [row data], [col data]).

In the FIG. 7 example the image represents training data and thus the partition present values are set to 0 or 1 indicating certainty with regard to whether or not a partition is present. The corresponding partition location is also clearly specified for each of the indicated partitions. In the FIG. 7 example the row partition is located at the center of row portion RP1 and thus the location indicator is set to 0. In RP2 the row partition is 25% down from the top of the RP2 and thus the position value is set to −0.5. In the case of CP1 the first column portion does not include a partition and thus both the partition presence indicator and location indicator for CP1 are set to 0. In the case of column portion CP2 a partition is present so the partition indicator is set to 1 and the location is indicated to be 25% from the end of the column portion CP2 by specifying +0.5 as the partition location for CP2.

Figure 8:
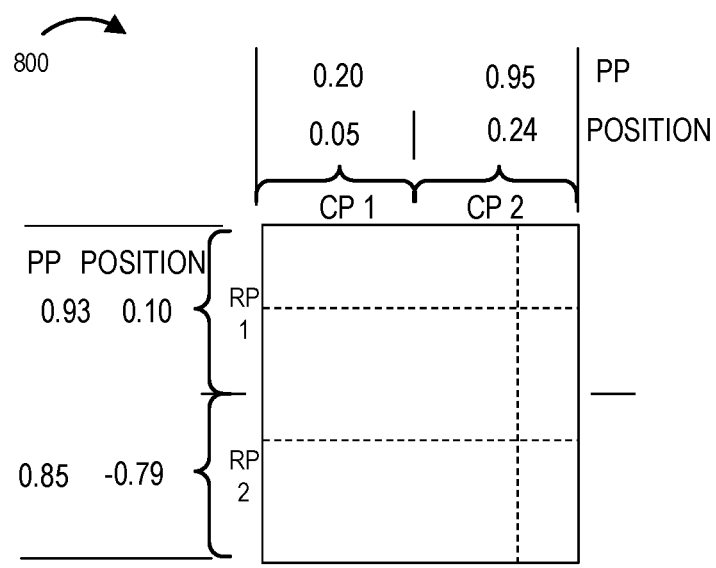
FIG. 8 illustrates an example of the results of using a trained neural network to process an image including the two row partitions and one column partition shown in FIG. 8.

FIG. 8 shows an example of the neural network evaluating the image shown in FIG. 8. The exemplary data received from evaluation when providing the grayscale values representing the image shown in FIG. 8 in one embodiment is: "[(0.93 0.10), (0.85 −0.79)] [(0.20 0.05), (0.95 0.24)]" (were the data is presented in the format: [row data], [col data]).

FIG. 8 illustrates an example of the results of using a trained neural network to process an image including two row portions and two column portions, e.g., using the training data shown in FIG. 17 and additional training images and associated data.

Note that in the FIG. 8 example non-integer values may be and often are returned. The returned values with regard to the partition present indicator values are probability indicators. Similarly, there is some uncertainty associated with the location indicators but this uncertainty is relatively small in the case of a well trained neural network. Consider for example that the partition present indicator value for CP1 in which no partition is located is 0.20 in the FIG. 8 example. This indicates that the probability of a partition being present in column portion CP1 is low, e.g., only 20 percent and the portion can be treated as not including a partition and the partition location information for CP1 can be ignored. However, the partition present information for CP 2 is 0.95 indicating a 95 percent probability that a partition is present in which case the portion can be treated as including a column partition and the partition location information 0.24 can be used to determine the location of the column partition in CP1.

Figure 9:
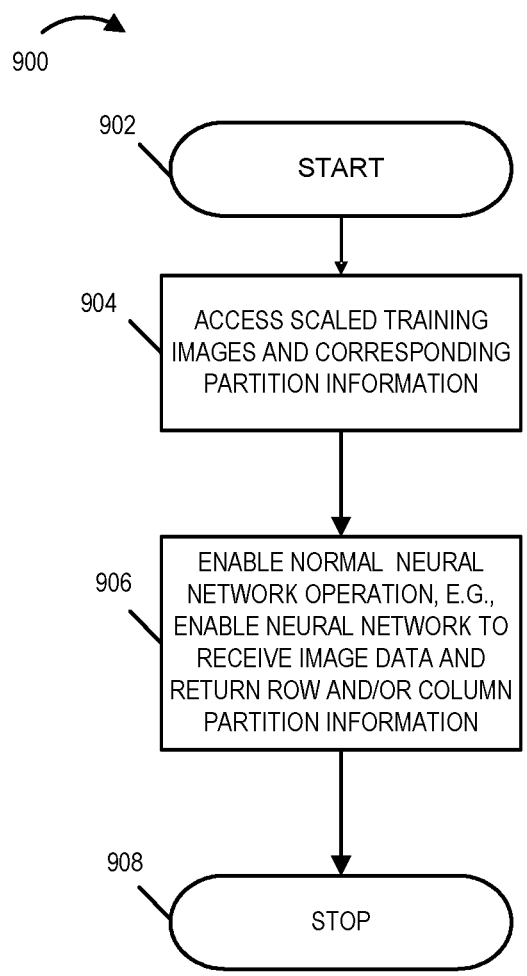
FIG. 9 illustrates a neural network training process used to train a neural network in accordance with some embodiments of the invention.

FIG. 9 illustrates a neural network training process 900 used to train a neural network in accordance with some embodiments of the invention. The process maybe implemented by the server 102 to train the neural network 103, e.g., under control of the processor 122 of form processing device 108, a processor in the server or a processor in another device in the system. The method 900 begins in step 902 with the device, e.g., server 102, starting the method in step 902, e.g., by the processor 105 in the server executing a neural network (NN) training application 107 stored in memory 109. Operation proceeds from start step 902 to training access data step 904 in which the training images and corresponding partition information are retrieved from the training data store 110 and then used in step 905 to train the image pattern recognition neural network 103 to recognize row and/or column partitions. As previously discussed the training data includes a plurality of images, e.g., grayscale images, of a predetermined shape (e.g., square) and size. In addition, for each image there is a set of row and column training values with a pair of values being provided for each of a plurality of row image portions and column image portions. The pair of values includes a first value, e.g., a partition presence indicator value which is 0 or 1 in some embodiments and a second value, a partition position value, e.g., a value in the range of −1 to +1 in some embodiments. The number of row and column image portions in each image for which the neural network is trained is fixed, e.g., predetermined in some embodiments.

As part of the training process the neural network 103 is configured to generate output values corresponding to the training input values when the training image to which the values correspond is processed. While shown as a single neural network, in some embodiments separate neural networks are trained to generate row partition information while another neural network is trained to generate column partition information. The separate row and column partition information recognition networks can operate in parallel as separate networks or as part of, e.g., layers in, a larger single neural network 103. The neural network 103 processes input images, considers image features such as pixel values, contrast, etc. and operates to identify the patterns, e.g., partition information, for which the neural network is trained. In various embodiments the training data 110 includes a plurality of forms including tables with partitions where the forms are of the types likely to be processed in the future by the form processing device 108, e.g., invoices and/or order forms.

Once training of the neural network 103 is complete operation proceeds to step 906 in which normal neural network operation is enabled, e.g., the neural network 103 is enabled to receive image data including unknown table partition locations and enabled to return partition pattern information, e.g., a pair of values for each row or column image portion providing an indication of whether a partition is present or not in a particular image portion and, if a partition is present, a value indicating the location of the partition in the image portion.

With the training complete and normal operation enabled, operation proceeds to stop step 908. As discussed above, once trained the neural network 103 can and in some embodiments is used to recognize partitions and provide partition information to one or more form processing device 108. Thus it should be appreciated that the trained neural network 103 can be used to provide service to multiple form processing devices.

Figure 10:
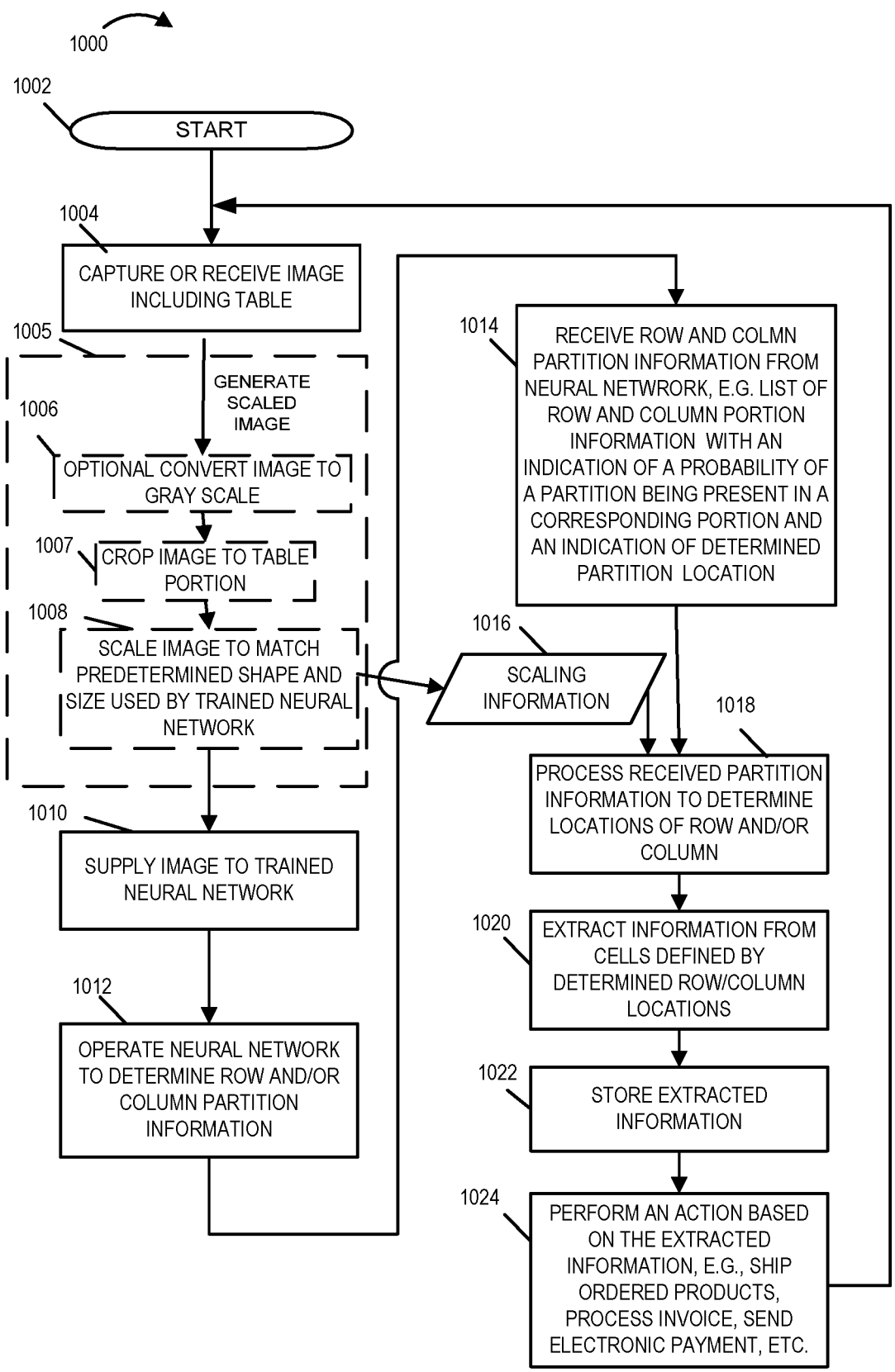
FIG. 10 illustrates the steps of detecting table partition information through the use of a trained neural network and using such information in accordance with one exemplary embodiment.

FIG. 10 illustrates the steps 1000 of a method detecting table partition information through the use of a trained neural network 103 and using the partition information returned from the neural network in accordance with one exemplary embodiment. The method begins in start step 1002, e.g., with the processor 122 of the form processing device executing the form processing application 242. Operation proceeds from start step 1002 to capture or receive step 1004 in which an image including a table is captured or received. The image maybe and in some embodiments is captured by camera 114' or document scanner 114" or received via network interface 206 or wireless interface 204. In the case where the captured or received image is color, step 1006 is used in some embodiments to convert it to a grayscale image. Crop step 1007 is used in cases where the table occupies only a portion of the received image. In step 1007 the image to be processed is cropped so that the table portion occupies the full image or at least most of the image area.

Operation proceeds from step 1004, 1006 or 1007, depending on which if any of optional steps 1006, 1007 are implemented, to step 1008. In step 1008 the image, a grayscale image at this point in the processing, is scaled to match the predetermined size and shape used by the trained neural network 103 and/or 103'. In some embodiments this involves scaling the input image to be a square shape of a predetermined size. The amount of scaling, e.g., vertical and horizontal scaling, of the input image performed in step 1008 to transform the input image to the shape and size used by the neural network 103 is stored in memory as scaling information 1016 and made available for later use in determining where partitions identified by the neural network 103 are located in the input image. Step 1008 is shown with dashed lines since if the input image matches the size and shape used by the neural network no scaling is required and thus scaling will not be performed. Scaling information 1016 will indicate the amount of scaling or that no scaling was performed.

Operation proceeds from step 1008 to step 1010 in which the image which has been processed as needed to ensure that it is the size and shape used by the neural network 103 or 103' is supplied to the neural network 103 or 103' being used in the particular embodiment. For cell phone embodiments the server based neural network 103 will normally be used but in other cases a local neural network 103' may be used.

In step 1012 the neural network 103 or 103' is operated to determine row and/or column partition information. The row and column partition information may be, and sometimes is, determined by different portions of the neural network 103 or 103', e.g., with row information being determined by a row partition information neural network or layer and the column partition information being determined by a column partition information network or layer with various networks or layers forming the neural network 103 or 103'. In some embodiments the neural network returns a pair of information values for each of a predetermined number of row image portions and column image portions. The information for each portion includes a partition present indicator value and a partition location value. The neural network 103 or 103' returns the partition information to the processor 122 for further use by the form processing application. In some embodiments as will be discussed elsewhere in this application images are treated as including 70 row portions and 70 column portions resulting in a total of 140 row information values and 140 column information values being returned in the particular embodiment.

In step 1014 the partition information is received, e.g., as a list of row and column partition information values. In step 1018 the partition information is used along with scaling information 1016 to determine the location of partitions in the image being processed. For each partition that is indicated as being present in an image portion the corresponding location is determined in the original image. The scaling information 1016 allows the partition location information obtained from the neural network to to be used, e.g., converted into, a location value in the original image where the detected partition is located. This conversion is based in some embodiments on the number of the image portion in which the partition was located, the location of the partition in the image portion and the scaling which was performed.

The determined row and/or column partition locations define information cells in the image being processed. In step 1020 information is extracted from the content of the cells defined by the determine row/column locations. This may and sometimes does involve the processor using the optical character recognition (ORCR) application 244 to recognize letters, words and/or numbers included in the information cells defined by the partition information obtained from the neural network. While the extraction operation could be and sometimes is performed directly on the scaled images used for partition recognition, thereby avoiding the need for step 1018, the OCR operation is more likely to be successful one the unscaled full resolution input image. For this reason in most but not necessary all embodiments the partition information is used to extract information from the original image rather than the scaled image.

In step 1022 the extracted information is stored in memory, e.g., as extracted form information/data 254. In step 1024 an action is then performed based on the extracted information. In some embodiments step 1024 includes shipping one or more ordered products, e.g., when the processed form is an order form. In other cases such as when the form is an invoice payment maybe and sometimes is sent electronically or by mail and account information updated.

Operation is shown proceeding from step 1024 to step 1004 to show that the form processing application 242 can process forms on an ongoing basis, e.g., with images being sent to the neural network 303 or 303' as each new image is processed.

Thus by training and using a neural network 303 or 303' in accordance with the invention partitions can be identified and information extracted even though for a given received image including a table how the table is partitioned is not know before hand.

Various features and a particular exemplary embodiment will now be discussed in greater detail.

In some embodiments the method shown in FIG. 10 takes as input a grayscale image. Prior to processing of the image, in some embodiments where a table is likely to be in a large image of a full semi-structured form, the table location is identified the table portion extracted as a cropped image. The cropped image is then used as the input to the table partition identification method, e.g., shown in FIG. 10. Thus, the image the method receives as input is expected to be an image of a table.

As the the neural network 103 expects a static input size, the input image is scaled to a constant size. The values for each pixel of the image go from 0 (black) to 1 (white). This size is 448×448 in one particular embodiment, but this is an implementation detail and other sizes can be used.

The image data is passed through multiple layers of a ResNet (Residual Neural Network), and gets transformed in one particular embodiment down into a 14×14×64 tensor of floating point values (exact dimensions are an implementation detail and not critical to the invention). This data isn't easily understandable by humans and represents the ResNet's internal transformation of the data. Ultimately the purpose of this step is to reduce the spatial dimensionality of the data from 448×448 to a smaller 3D tensor. The fact that these networks are ResNets in the exemplary embodiment is purely an implementation detail, as any Convolutional Neural Network architecture might be substituted.

In the exemplary embodiments Row/Column ResNets are used as part of the neural network 103. One ResNet reduces dimensionality horizontally (row information) and the other one reduces dimensionality vertically (column information). The output of this step is (for both rows & columns respectively) a 70×2 tensor of floats (again, the size is an implementation detail and not critical to the invention).

Both of the 70×2 tensors are passed into the transform processes, respectively, which transform the data into an array of 70 tuples: (is_on, position). The is_on is a float from 0 to 1, that represents whether or not this partitioning line is active. The position is either an x coordinate (for column information) or y coordinate (for row information).

The row & column information is aggregated together and sent back to the form processing device for use in determining the row and column partitions in the actual image for facilitate data extraction and use from information cells.

If expressed in C-like pseudo-code, the method in one exemplary embodiment would be roughly as follows:

```
function partition_table_image( GrayscaleImage input_image ) {
    GrayscaleImage resized_image =
    resize_image_to_488_x_488(input_image);
        Tensor intermediary_data =
        resnet_to_14_x_14_x_64(resized_image);
        Tensor raw_row_information =
    vertical_resnet_to_70_x_2(intermediary_data);
        Tensor raw_column_information =
    horizontal_resnet_to_70_x_2(intermediary_data);
        Tuple row_partition_data =
    transform_raw_information(raw_row_information);
        Tuple col_partition_data =
    transform_raw_information(raw_col_information);
        return (row_partition_data, col_partition_data);
}
```

In one exemplary embodiment each of the ResNets was trained on a set of form image data, resulting in the use of internal weights & biases that are well suited for identifying form partitions and their locations in an image.

ResNet layers, or any CNN in general, typically reduce the spatial dimensionality of an input by a factor of 1 (no reduction) or 2 (halved). This can be performed multiple times, by chaining multiple layers of a CNN together. For example, one possibility for configuring CNN layers might be the following:

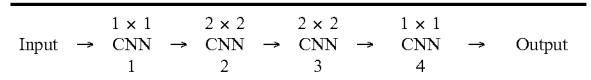

Input: 16×16×1 (a grayscale image, for example)
CNN 1 Output: 16×16×16
CNN 2 Output: 8×8×64
CNN 3 Output: 4×4×256
CNN 4 Output: 4×4×512

In this example, CNNs 1 and 4 did no spatial dimensional reduction (reduced by a factor of 1, so nothing), while CNNs 2 and 3 reduced spatial dimensionality by 2 each time. The third dimension given above is sometimes called the filter size, and is irrelevant to this. The exact configuration of a ResNet implementation will likely vary for most every program out there. The layers are basically lego-blocks of possibility. This is also a bit of a simplification, as the details of how ResNet layers work are too complicated for this.

In one particular implementation used to recognize partition information there were 50 layers, each with 3 internal CNN layers, bringing it to the order of ~150 CNN layers hover the number of layers is not critical for the invention. For our purposes of a particular implementation it is useful to know how many times the neural network reduces dimensionality by 2. In one particular implementation the spatial dimensionality was reduced 5 times (thus by a factor $2^5=32$ times) in the width & height dimension. Input data which in such an embodiments was 448×448, was divided by 32×32 to a 14×14×64 size. With the final filter size being 64, but this is not critical.

As discussed above, CNNs can be reduced by 1 or 2 along both dimensions. As well, we can choose to reduce dimensionality only in one dimension. For example, a consider a different hypothetical CNN network that can be expressed as a set of CNNs as follows:

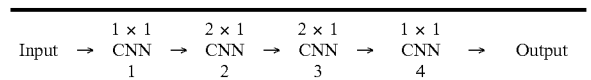

Input: 16×16×1
CNN 1 Output: 16×16×16
CNN 2 Output: 8×16×32
CNN 3 Output: 4×16×64
CNN 4 Output: 4×16×128

In this example, the first dimension is reduced by 2 twice, and the second dimension hasn't been reduced at all.

Typically, when referring to image-based tensors, the first dimension is height, and the second is width. This is different from our typical intuition of size, e.g. monitor dimensions. With regard to a monitor one would typically say that my monitor is 1920×1080 (width×height), but if in passing an image in as a tensor, the pixel values are passed in organized as 1080×1920×1 (height, width). This sometimes causes confusion for a casual look at the dimensions.

In terms of image orientation in some embodiments, we consider the top-left of the image as the starting point for providing pixel values. So, height×width, and anything from the third dimension onward could be considered as multiple ways of looking at the inputs (simplified to the extreme). In one example we went from an image that was 16 tall and 16 wide, to a tensor that was 4 tall and 16 wide.

In one embodiment given that we have a 14×14×64 input image, we want to reduce this to 14×1×64 and 1×14×64 for our row and column information, respectively. To do this, we pass the data through ResNet layers in the neural network that reduce the dimensionality by 1×2 and 2×1 (row/column, respectively) 4 times in total. This yields the correct dimensionality. We then send it through a final CNN to reinterpret the data as a 2D tensor of dimensionality 70×2.

Alternative network configurations are possible. For example, the input image sized for the neural network could be sent through a fully connected network of size 140 and reshape the results as 70×2. The method of how we get to 70×2 is less important than the fact that we reduce a 14×14×N tensor to a 70×2 tensor for rows & columns each.

The discussed embodiment which discusses a 70×2 implementation for rows and columns treats the image as having 70 row portions and 70 column portions with the output including two values for each row and column portion, a first value indicating whether or not a partition is present and a second value providing partition location information. Since many forms do not include more than 70 rows and 70 columns such a number of image portions and thus possible partitions has been found suitable for a wide range of applications but more or less numbers of image portions and thus possible partitions can be supported in other embodiments.

The set of 70×2 output values, referred to as the output tensor corresponding to row or column partitions is effectively interpreted as 70 partition present indicator values and corresponding partition location values, e.g., partition position_offset values.

For illustrative purposes, an image 600 with a corresponding 4×2 row partition tensor of partition information will be used to explain the invention instead of using a 70×2 row tensor example.

FIG. 6 shows an example of a row partition and the partition present (is_on) and position location (position_offset) values for an image including 4 row portions RP1, RP2, RP3 and RP4. The corresponding 4×2 tensor of row partition information is formed by the set of values shown in columns 602, 604.

Note that machine learning often tends to favor normalized values. Thus in many cases for good results, things should be centered either in the range 0 to 1 or −1 to 1. This is called normalized data because the values are scaled or otherwise controlled to fall within the particular range of values being used.

While in some steps of processing the partition present value maybe unbounded, in some embodiments to normalize the partition present value to a 0 to 1 range, a sigmoid function is applied to it resulting in a value 1 or 0 representing an on or off. That is a 1 indicating a partition is present or and a 0 indicating a partition is not present. This value position present value of 0 or 1 maybe and sometimes is used in future processing, e.g., within the neural network 103 or external to it.

For the position location information this can be a little more complex in terms of values than the partition present indicator. The position location value, also sometimes referred to as a position_offset, can and sometimes is defined as a number of half-rows away from the midpoint of an image portion. In one such embodiment this means that given any "row", a position_offset of −1 is at the very top, of 1 is at the bottom and of 0 is right in the middle. FIG. 5 shows an example of a row portion, and the position_offset values of its top, middle and bottom.

In some embodiments it is possible for values above or below −1 to 1 to occur for the position_offset. This means the location will be calculated to be in a neighbor's row. It might be the case where in two adjacent rows, you might have, e.g., offset 0.8 and offset −1.2 for the location of two separate partitions. This is, however, the same line as when mapped to the full image space, the coordinate is the same. Thus, it's not entirely uncommon for the same partition to be found in more than one row. In some embodiments a post neural network processing step is used to identify and remove duplicate or unlikely partitions.

In the case of the embodiment where 70 pairs of values are generated as a result of the neural network processing of an image, the results should be transformed back to values which can be used to find the location in the original input image prior to scaling for neural network processing purposes.

In the example of 70 row portions, at the output of the neural network processing step the form processing device 108 will have a series of 70 pairs of values of (is_on, position_offset) which are transformed, taking into consideration the image scaling that was applied to generate the image provided to the neural network to (is_on, actual image position) where actual image position is a value from 0 to 448 corresponding to the possible row positions in the original input image. The formula used in one embodiment is straightforward (row_index is from 0 to 69):
with the formal being:

$$\text{actual image position} = 448 * (\text{row\_index} * \text{position\_offset}/70 + 1/(2*70))$$

These actual image position values are used for the row partition location information allowing for the locations of the row portions to be identified in the captured image. Column partitions are identified and the neural network output, e.g, pairs of values for each portion of the image, are processed in the same manner as the row partition information but with the output indicating the location of column partitions in the captured image.

Numbered List of Exemplary Method Embodiments

Method Embodiment 1. A method of detecting partition information, the method comprising: operating (1012) a neural network to perform partition recognition on a scaled version of an input image, said neural network being a neural network which was trained using training data, said training data including images that include information tables and for each image including an information table one or more partition presence indicators and corresponding partition location information, said partition recognition operation producing a set of partition information including one or more partition presence indicators and for each of the one or more partition presence indicators indicating a partition is present, corresponding partition location information; and determining (1018) from the one or more partition presence indicators and corresponding partition location information a location of at least one row or column partition in the input image.

Method Embodiment 2. The method of Method Embodiment 1 further comprising: extracting (1020) information from an information cell in the input image identified based at least partially on the determined row or column position.

Method Embodiment 3. The method of Method Embodiment 2, further comprising: performing an action based on the extracted information, said action including shipping a product.

Method Embodiment 4. The method of Method Embodiment 1, wherein said neural network generates for each of a predetermined number of row image portions and column image portions a corresponding partition presence indicator value and, for at least each partition presence indicator value indicating presence of a partition, a corresponding partition location value.

Method Embodiment 5. The method of Method Embodiment 2, wherein the partition presence indicator value is a binary value.

Method Embodiment 6. The method of Method Embodiment 1, further comprising: scaling the input image to generate said scaled version of the input image, said scaled version of the input image being a predetermined size and shape the neural network was trained to process.

Method Embodiment 7. The method of Method Embodiment 6, wherein said scaling step is part of generating a scaled image (1005), generating said scaled image further comprising: performing a color to grayscale conversion operation (1006) on said input image as part of generating said scaled image.

Method Embodiment 8. The method of Method Embodiment 7, wherein generating (1005) a scaled image further includes: performing a cropping operation (1006) as part of generating said scaled input image.

Method Embodiment 9. The method of Method Embodiment 6, further comprising: storing information (1016) indicating one or more of an amount of vertical scaling and horizontal scaling applied to said input image as part of said scaling operation to generate the scaled input image; and wherein said step of determining (1018) from the one or more partition presence indicators and corresponding partition location information in said partition information a position of at least one row or column partition in the input image uses said scaling information to determine the position of the at least one row or column partition in the input image.

Method Embodiment 10. The method of Method Embodiment 6, wherein said scaling converts a rectangular input image to a square scaled image.

Method Embodiment 11. The method of Method Embodiment 4, wherein said partition presence indicators are values in the range of 0 to 1, said range including both 0 and 1.

Method Embodiment 12. The method of Method Embodiment 11, wherein said partition location information includes location indicator values that are in the range of −1 to 1, said range including −1 and 1.

Numbered List of Exemplary System Embodiments

System Embodiment 13. A system for processing an input image, the system comprising: memory (116) for storing an input image to be processed; a neural network (103 or 103') that was trained using training data, said training data including images that include information tables and for each image including an information table one or more partition presence indicators and corresponding partition location information; and a processor (122) configured to control a form processing device (108) to: communicate a scaled version of said input image to said neural network (103 or 103'); receive a set of partition information from said neural network, said set of partition information including one or more partition presence indicators and corresponding partition location information; and determine (1018) from the one or more partition presence indicators and corresponding partition location information a position of at least one row or column partition in the input image.

System Embodiment 14. The system of System Embodiment 13 wherein the processor is further configured to control the form processing device to: extracting (1020) information from an information cell in the input image identified based at least partially on the determined row or column position.

System Embodiment 15. The system of System Embodiment 14, wherein the processor is further configured to control the form processing device to: perform an action based on the extracted information, said action including shipping a product.

System Embodiment 16. The system of System Embodiment 13, wherein said neural network generates for each of a predetermined number of row image portions and column image portions a corresponding partition presence indicator value and, for at least each partition presence indicator value indicating presence of a partition, a corresponding partition location value.

System Embodiment 17. The system of System Embodiment 14, wherein the partition presence indicator value is a binary value.

System Embodiment 18. The system of System Embodiment 13, wherein the processor is further configured to control the form processing device to: scale the input image to generate said scaled version of the input image, said scaled version of the input image being a predetermined size and shape the neural network was trained to process.

System Embodiment 19. The system of System Embodiment 18, wherein the process is further configured to control the form processing device to: perform a color to grayscale conversion operation (1006) on said input image as part of generating said scaled image.

System Embodiment 19A. The system of System Embodiment 18, wherein said memory further store information (1016) indicating one or more of an amount of vertical scaling and horizontal scaling applied to said input image as part of said scaling operation to generate the scaled input image.

System Embodiment 19B. The system of System Embodiment 18, wherein said scaling converts a rectangular input image to a square scaled image.

System Embodiment 19C. The system of System Embodiment 16, wherein said partition presence indicators are values in the range of 0 to 1, said range including both 0 and 1.

System Embodiment 19D. The system of System Embodiment 19C, wherein said partition location information includes indicator values that are in the range of −1 to 1, said range including −1 and 1.

Numbered List of Computer Readable Medium Embodiments

Computer Readable Medium Embodiment 1 A non-transitory computer readable medium comprising processor executable instructions which when executed by a processor of a form processing device causes the processor to control the form processing device to perform the steps of: using (1012) a neural network to perform partition recognition on a scaled version of an input image, said neural network being a neural network which was trained using training data, said training data including images that include information tables and for each image including an information table one or more partition presence indicators and corresponding partition location information, said partition recognition operation producing a set of partition information including one or more partition presence indicators and for each of the one or more partition presence indicators indicating a partition is present, corresponding partition location information; and determining (1018) from the one or more partition presence indicators and corresponding partition location information in said partition information a position of at least one row or column partition in the input image.

The techniques of various embodiments may be implemented using software, hardware and/or a combination of software and hardware. Various embodiments are directed to apparatus, e.g., an image processing device or system. Various embodiments are also directed to methods, e.g., a method of extracting, e.g., copying to a clipboard, and using data/information from a user selected area of a displayed web page. Various embodiments are also directed to machine, e.g., computer, readable medium, e.g., ROM, RAM, CDs, hard disks, etc., which include machine readable instructions for controlling a machine to implement one or more steps of a method.

In various embodiments apparatus described herein are implemented using one or more components to perform the steps corresponding to one or more methods. Thus, in some embodiments various features are implemented using components. Such components may be implemented using software, hardware or a combination of software and hardware. In some embodiments in which the components are implemented in hardware, the components are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s). Each of the steps of the method may be, and sometimes, are implemented by a circuit with different circuits being used for each of the different steps in some but not all embodiments.

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments, the image processing device is a desktop computer. In some embodiments the image processing device is a portable device, e.g., a laptop computer, handheld computer, tablet computer, smart phone, personal data assistant, etc., with a processor that implements the method.

In some embodiments components are implemented using software, in other embodiments components are implemented in hardware, in still other embodiments the components are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of detecting partition information, the method comprising:
    operating a neural network to perform partition recognition on a scaled version of an input image, said neural network being a neural network which was trained using training data, said training data including images that include information tables and for each image including an information table one or more partition presence indicators and corresponding partition location information, said partition recognition producing a set of partition information including multiple partition presence indicators, each of the multiple partition presence indicators corresponding to a different portion of said scaled version of the input image, said set of partition information further including for each of the partition presence indicators, in said multiple partition presence indicators, that indicates a partition is present, corresponding partition location information, said set of partition information including a first pair of partition information values corresponding to a first portion of said scaled version of the input image, said first portion of said scaled version of the input image corresponding to multiple rows or columns of pixels in said input image, said first pair of partition information values including a first partition presence indicator value having a value indicating a partition is present in the first portion of the scaled version of said input image and a first partition location value indicating a location of said first partition in the first portion of the scaled version of the input image; and
    determining from one or more partition presence indicators of said multiple partition presence indicators indicating a partition is present and corresponding partition location information at least one location of a row or column partition in the input image, said determining including determining the location of a first row or column partition in the input image based on at least the first partition location value and information indicating a location of the multiple rows or columns of pixels in said input image to which the first portion of said scaled version of the input image corresponds.

2. The method of claim 1, further comprising:
    extracting information from an information cell in the input image identified based at least partially on the determined location of the first row or column partition.

3. The method of claim 2, further comprising:
    performing an action based on the extracted information, said action including shipping a product.

4. The method of claim 1, wherein said first portion of said scaled version of the input image is a first row portion of said scaled version of the input image corresponding to multiple rows of pixels in the input image, and
    wherein said partition information further includes a second pair of partition information values corresponding to a second row portion of said scaled version of the input image, said second pair of partition information values including a second partition presence indicator value having a value indicating a partition is present in the second portion of the scaled version of said input image and a second partition location value indicating a location of said second row partition in the second portion of the scaled version of the input image.

5. The method of claim 4, wherein said partition presence indicators are values in the range of 0 to 1, said range including both 0 and 1.

6. The method of claim 4,
    wherein said partition information further includes a third pair of partition information values, said third pair of partition information values corresponding to a third portion of said scaled version of the input image, said third portion of said scaled version of the input image being a column portion of said scaled version of the input image, said third pair of partition information values including a third partition presence indicator value having a value indicating a partition is present in the third portion of the scaled version of said image and a third partition location value indicating a location of a column partition in the third portion of the scaled version of said input image.

7. The method of claim 6,
    wherein said first and second row portions correspond to different non-overlapping row portions of said scaled version of the input image; and
    wherein the third portion of said scaled version of the input image corresponds to a column portion of said scaled version of the input image which overlaps said first and second row portions of said scaled version of the input image.

8. The method of claim 1,
    wherein the first partition presence indicator value is a binary value; and
    wherein the first partition location value is a value in the range of −1 to 1, said range including −1 and 1.

9. The method of claim 1, further comprising:
    scaling the input image to generate said scaled version of the input image, said scaled version of the input image being a predetermined size and shape that the neural network was trained to process; and
    wherein determining the location of a first row or column partition in the input image based on at least the first partition location value includes using a scaling factor corresponding to the scaling of the input image that was used to generate said scaled version of the input image along with the first partition location value to compute the location of the first row or column partition in the input image.

10. The method of claim 9, wherein said scaling step is part of generating a scaled version of the input image, generating said scaled version of the input image further comprising:
    performing a color to grayscale conversion operation on said input image as part of generating said scaled version of the input image.

11. The method of claim 10, wherein generating a scaled version of the input image further includes:
    performing a cropping operation as part of generating said scaled version of the input image.

12. The method of claim 9, further comprising:
    storing information indicating one or more of an amount of vertical scaling and horizontal scaling applied to said input image as part of said scaling operation to generate the scaled version of the input image; and
    wherein said step of determining from one or more partition presence indicators of the multiple partition presence indicators indicating a partition is present and corresponding partition location information at least one location of a row or column partition in the input image uses said scaling information to determine the location of the row or column partition in the input image.

13. The method of claim 9, wherein said scaling converts a rectangular input image to a square scaled image.

14. The method of claim 1, wherein the information indicating a location of the multiple rows or columns of pixels in said input image to which the first portion of said scaled version of the input image corresponds includes a row index value which is a function of the number of row portions included in said input image.

15. A method of detecting partition information, the method comprising:
 operating a neural network to perform partition recognition on a scaled version of an input image, said neural network being a neural network which was trained using training data, said training data including images that include information tables and for each image including an information table one or more partition presence indicators and corresponding partition location information, said partition recognition producing a set of partition information including one or more partition presence indicators and for each of the one or more partition presence indicators indicating a partition is present, corresponding partition location information;
 wherein said set of partition information includes for each of a predetermined number of row image portions and column image portions a corresponding partition presence indicator value and, for at least each partition presence indicator value indicating presence of a partition, a corresponding partition location value;
 wherein said partition presence indicators are values in the range of 0 to 1, said range including both 0 and 1;
 wherein said partition location information includes location indicator values that are in the range of −1 to 1, said range including −1 and 1; and
 wherein the method further includes:
 determining from the one or more partition presence indicators of the produced set of partition information, indicating a partition is present, and corresponding partition location information at least one location of a row or column partition in the input image.

16. A system for processing an input image, the system comprising:
 memory for storing an input image to be processed;
 a neural network that was trained using training data, said training data including images that include information tables and for each image including an information table one or more partition presence indicators and corresponding partition location information; and
 a processor configured to control a form processing device to:
 communicate a scaled version of said input image to said neural network;
 receive a set of partition information from said neural network, said set of partition information including multiple partition presence indicators, each of the multiple partition presence indicators corresponding to a different portion of said scaled version of the input image, said set of partition information further including for each of the partition presence indicators, in said multiple partition presence indicators, that indicates a partition is present, corresponding partition location information, said partition information including a first pair of partition information values corresponding to a first portion of said scaled version of the input image, said first portion of said scaled version of the input image corresponding to multiple rows or columns of pixels in said input image, said first pair of partition information values including a first partition presence indicator value having a value indicating a partition is present in the first portion of the scaled version of said input image and a first partition location value indicating a location of said first partition in the first portion of the scaled version of the input image; and
 determine from one or more partition presence indicators of the multiple partition presence indicators indicating a partition is present and corresponding partition location information at least one position of a row or column partition in the input image, said determining including determining the location of a first row or column partition in the input image based on at least the first partition location value and information indicating a location of the multiple rows or columns of pixels in said input image to which the first portion of said scaled version of the input image corresponds.

17. The system of claim 16 wherein the processor is further configured to control the form processing device to:
 extract information from an information cell in the input image identified based at least partially on the determined location of the first row or column partition.

18. The system of claim 17, wherein the processor is further configured to control the form processing device to:
 perform an action based on the extracted information, said action including shipping a product.

19. The system of claim 16, wherein said first portion of said scaled version of the input image is a first row portion of said scaled version of the input image, and
 wherein said partition information further includes a second pair of partition information values corresponding to a second row portion of said scaled version of the input image, said second pair of partition information values including a second partition presence indicator value having a value indicating a partition is present in the second portion of the scaled version of said input image and a second partition location value indicating a location of said second row partition in the second portion of the scaled version of the input image.

20. The system of claim 16,
 wherein the first partition presence indicator value is a binary value; and;
 wherein the first partition location value is a value in the range of −1 to 1, said range including −1 and 1.

21. The system of claim 16, wherein the processor is further configured to control the form processing device to:
 scale the input image to generate said scaled version of the input image, said scaled version of the input image being a predetermined size and shape that the neural network was trained to process; and
 use a scaling factor corresponding to the scaling of the input image to generate said scaled version of the input image along with the first partition location value to compute the location of the first row or column partition in the input image, as part of being configured to control the form processing device to determine the location of a first row or column partition in the input image based on at least the first partition location value.

22. The system of claim 21, wherein the processor is further configured to control the form processing device to:

perform a color to grayscale conversion operation on said input image as part of generating said scaled version of the input image.

23. A non-transitory computer readable medium comprising processor executable instructions which when executed by a processor of a form processing device causes the processor to control the form processing device to implement the steps of:

operating a neural network to perform partition recognition on a scaled version of an input image, said neural network being a neural network which was trained using training data, said training data including images that include information tables and for each image including an information table one or more artition presence indicators and corresponding partition location information, said partition recognition producing a set of partition information including multiple partition presence indicators, each of the multiple partition presence indicators corresponding to a different portion of said scaled version of the input image, said set of partition information further including for each of the partition presence indicators, in said multiple partition presence indicators, that indicates a partition is present, corresponding partition location information, said set of partition information including a first pair of partition information values corresponding to a first portion of said scaled version of the input image, said first portion of said scaled version of the input image corresponding to multiple rows or columns of pixels in said input image, said first pair of partition information values including a first partition presence indicator value having a value indicating a partition is present in the first portion of the scaled version of said input image and a first partition location value indicating a location of said first partition in the first portion of the scaled version of the input image; and determining from one or more partition presence indicators of the multiple partition presence indicators that indicates a partition is present and corresponding partition location information at least one location of a row or column partition in the input image, said determining including determining the location of a first row or column partition in the input image based on at least the first partition location value and information indicating a location of the multiple rows or columns of pixels in said input image to which the first portion of said scaled version of the input image corresponds.

* * * * *